United States Patent
Pfarr et al.

(10) Patent No.: US 7,025,196 B2
(45) Date of Patent: Apr. 11, 2006

(54) FRICTION DRIVE CONVEYOR

(75) Inventors: Craig E. Pfarr, Issaquah, WA (US); Norman A. Rudy, Snohomish, WA (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 10/896,330

(22) Filed: Jul. 21, 2004

(65) Prior Publication Data

US 2005/0077152 A1    Apr. 14, 2005

Related U.S. Application Data

(60) Provisional application No. 60/489,151, filed on Jul. 21, 2003.

(51) Int. Cl.
   *B65G 23/44* (2006.01)

(52) U.S. Cl. ........................... 198/813; 198/815
(58) Field of Classification Search ............ 198/835, 198/813, 815
   See application file for complete search history.

(56) References Cited

U.S. PATENT DOCUMENTS

| 3,275,126 | A | * | 9/1966 | Hartzell, Jr. ............... 198/815 |
| 4,041,785 | A | * | 8/1977 | Roark ........................ 198/813 |
| 4,283,181 | A |   | 8/1981 | Sproul |
| 4,299,584 | A |   | 11/1981 | Sproul |
| 4,309,174 | A |   | 1/1982 | Sproul |
| 6,073,755 | A | * | 6/2000 | Hilliard et al. ............. 198/813 |
| 6,269,231 | B1 | * | 7/2001 | Castelli et al. ............. 198/813 |
| 6,349,812 | B1 | * | 2/2002 | Epp et al. .................. 198/813 |
| 6,796,419 | B1 | * | 9/2004 | Sousek et al. .............. 198/814 |

FOREIGN PATENT DOCUMENTS

EP    0 725 230 A2    8/1996

* cited by examiner

*Primary Examiner*—James R. Bidwell
(74) *Attorney, Agent, or Firm*—Christensen O'Connor Johnson Kindness pllc

(57) ABSTRACT

A conveyor 12 includes an infeed/scanning section (18) and a cutting/outfeed section (22). Both sections have an endless belt (70) and (180) each driven by a friction drive roller (100) and (200). Adequate frictional load is applied between the endless belts and corresponding drive rollers by tension assemblies, each having a tensioning roller (86), (188) rotatably mounted on a pivot frame structure (112), (220) allowing the weight of the tensioning roller to be applied to the return run of the endless belts. Dampeners (130) (270) are integrated with the tensioning rollers (86) (188) to dampen vibrations in the endless belts (70) (180).

46 Claims, 10 Drawing Sheets

FRICTION DRIVE CONVEYOR

CROSS-REFERENCE TO RELATED APPLICATION

This application claims the benefit of U.S. Provisional Patent Application No. 60/489,151, filed Jul. 21, 2003.

FIELD OF THE INVENTION

The present invention pertains to portioning machines, and more particularly to precision conveyor systems for transporting work products through a plurality of processing areas of a portioning machine.

BACKGROUND OF THE INVENTION

Workpieces, including food products, are cut or otherwise portioned into smaller portions by processors in accordance with customer needs. Also, excess fat, bone, and other foreign or undesired materials are routinely trimmed from food products. It is often desirable to portion and/or trim the workpieces into uniform sizes, for example, for steaks to be served at restaurants or chicken fillets used in frozen dinners or in chicken burgers. Much of the portioning/trimming of workpieces, in particular food products, is now carried out with the use of high-speed portioning machines. These machines use various scanning techniques to ascertain the size and shape of the food product as it is being advanced on a moving conveyor. This information is analyzed with the aid of a computer to determine how to most efficiently portion the food product into optimum sizes. For example, a customer may desire chicken breast portions in two different weight sizes, but with no fat or with a limited amount of acceptable fat. The chicken breast is scanned as it moves on an infeed conveyor belt and a determination is made through the use of a computer as to how best to portion the chicken breast to the weights desired by the customer, so as to use the chicken breast most effectively.

Portioning machines of the foregoing type are known in the art. Such portioning machines, or portions thereof, are disclosed in prior patents, for example, U.S. Pat. Nos. 4,962,568 and 5,868,056, which are incorporated by reference herein. As typical, the portioning machine includes an infeed conveyor having a moving, solid belt that slides over a support structure. The infeed conveyor belt is driven at a selected speed by a drive motor. The drive motor can be composed of a variable speed motor to thus adjust the speed of the infeed belt. The workpieces are first carried by the infeed conveyor past a scanning station, whereat the workpieces are scanned to ascertain selected physical parameters, for example, their size and shape, and then determine their weight, typically by utilizing an assumed density for the workpieces. In addition, it is possible to locate discontinuities (including voids), foreign material, and undesirable material in the workpiece, for example, bones or fat in a meat portion.

The data and information measured/gathered at the scanning station is transmitted to a computer, preferably on board the portioning apparatus, which records the location of the workpiece on the infeed conveyor as well as the shape and other parameters of the workpiece. With this information, the computer determines how to optimally cut or portion the workpiece at the portioning station. Once the workpieces are scanned, they may be transferred to a cutting conveyor, typically composed of a metal mesh material. The portioning may be carried out by various types of cutting/portioning devices.

The cutting devices rely on the determined location of the workpiece on the belt at the scanning station to know where to make the cuts determined by the computer. Thus, it is important that the speed of the infeed conveyor and the cutting conveyor be accurately controlled, and ideally both conveyors will operate at the same, uniform speed. If the speeds of the conveyor vary, then the actual position of the workpiece relative to the cutting/portioning devices will not correspond to that calculated by the computer.

In addition, typically the metal belt of the cutting conveyor is driven by sprockets that engage the side margins of the belt, composed of formed flat wire. This type of drive introduces substantial variability in the speed that the cutting belt is driven. With each tooth of the sprocket engaging and disengaging the belt, the speed of the belt increases and decreases because of the variation in the pitch of the flat wire belt.

Also, natural belt resonance can set up oscillations or vibrations in both the infeed and the cutting belts, thereby causing the belt speeds to change. The present invention seeks to dampen oscillations and vibrations in the belts, as well as operate the belts at a constant speed and further reduce disturbances to the workpiece to be portioned as it is transferred from the infeed belt to the cutting belt.

SUMMARY OF THE INVENTION

A precision conveyor system for transporting products through a plurality of processing areas includes an elongate conveyor structure, a first endless belt having an infeed and an outfeed end and a drive roller or pulley mounted on the conveyor frame about which the endless belt is trained. The drive roller drives the belt through frictional engagement with the belt. The system also includes a belt tensioning and dampening system pivotally mounted on the conveyor frame for applying a tension load on the belt to maintain adequate frictional engagement between the belt and the drive roller and to apply a dampening load on the belt to dampen vibrations occurring in the endless belt.

In accordance with a further aspect of the present invention, the belt tensioning and dampening system includes a pivot frame pivotally mounted on the conveyor frame structure. In addition, a tensioning roller or pulley which engages the first endless belt is rotatably mounted on the pivot frame at a location spaced from the location that the pivot frame is mounted to the conveyor frame structure. In this manner, the weight of the tension roller is applied against the first endless belt by the pivoting action of the pivot frame relative to the conveyor frame structure.

In accordance with further aspects of the present invention, an alignment system is mounted on the conveyor frame structure to maintain the first endless belt in proper alignment with the drive roller.

In a further aspect of the present invention, the endless belt is composed of a plurality of pickets formed from flat wire disposed edgewise in the upright direction. The pickets extend transversely relative to the length of the belt.

In a further aspect of the present invention, the alignment system for maintaining the endless belt in alignment with the drive roller includes at least one sprocket is rotatably mounted relative to the drive roller to engage the endless belt.

In a further aspect of the present invention, a chain may be disposed along one or both sides of the endless belt for engagement with idler sprockets. In yet a further aspect of the present invention, the sprockets may be mounted on an idler pulley, with the first endless belt also being trained over the idler pulley.

In a further aspect of the present invention, a second endless belt is positioned so that its infeed end is adjacent the outfeed end of the first endless belt to receive work products from the first endless belt. The second endless belt is driven by a second friction drive roller. Also a drive control system controls the speeds of both the first and second endless belts.

In a further aspect to the present invention, the drive control system synchronizes the speeds of the first and second endless belts to be at substantially the same speed.

In accordance with a further aspect of the present invention, the second belt tensioning and dampening system is pivotally mounted to apply a tension load on the second endless belt to maintain adequate frictional engagement between the second endless belt and the second drive roller. The belt tensioning and dampening system also applies a dampening force on the second endless belt upon fluctuations of the tension load on the second endless belt.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
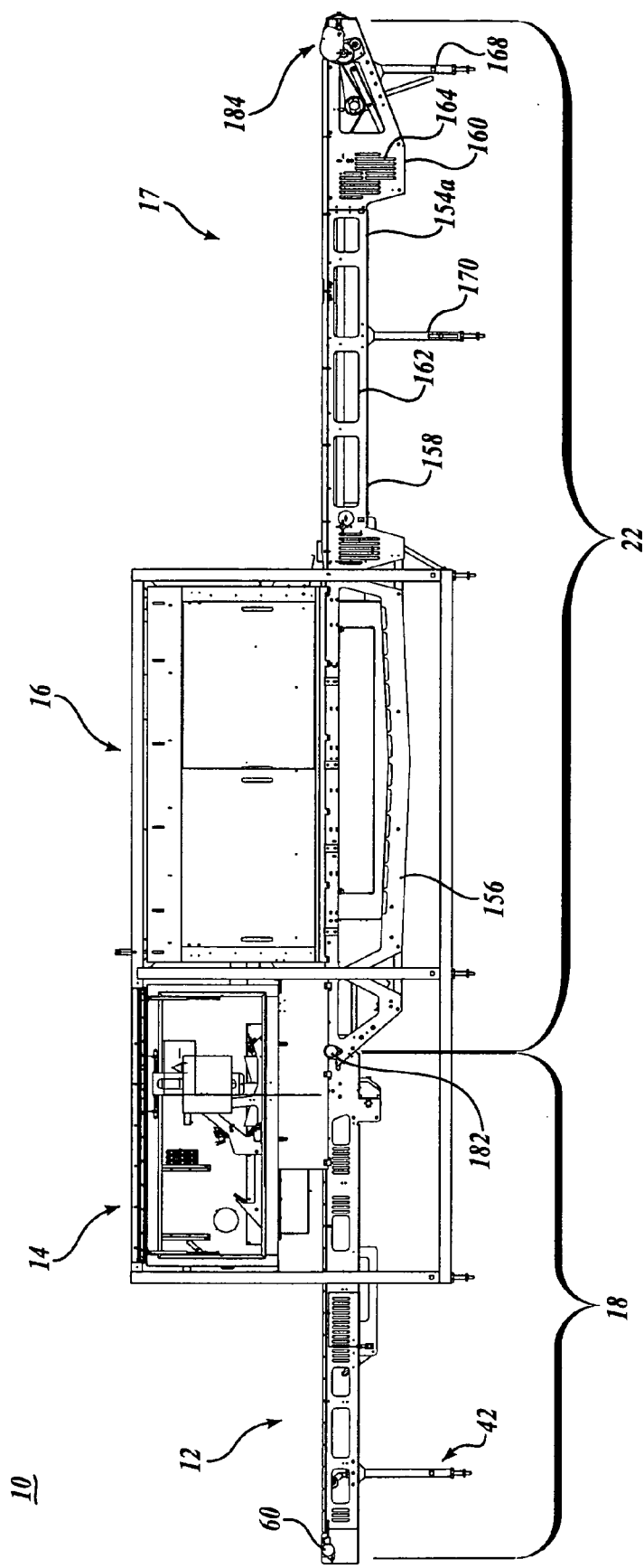
FIG. 1 is a side elevational view of the conveyor system in accordance with the present invention, which also illustrates a scanning station and a cutting station.

Referring initially to FIG. 1, the present invention in basic form includes a portioning apparatus 10 composed of a powered conveyor 12 for supporting workpieces to be portioned or trimmed. In the present invention, the terms "upstream" and "downstream" are used with respect to the direction of movement of the conveyor 12. The conveyor 12 carries workpieces past a scanning station 14 where the workpieces are scanned to ascertain selected physical parameters, for example, the size and shape of the workpiece, which information then can be used to determine the weight of the workpiece, typically by using assumed density for the workpiece. Also, during scanning, discontinuities (including voids), foreign material, and undesirable material are located in the workpiece, for example, bones or fat in a meat portion. At the scanning station, the position/location of the workpiece relative to the conveyor is ascertained. The information from the scanner is routed to a control system (not shown), consisting in part of a computer (not shown).

Next, the conveyor carries the scanned workpiece to a portioning/trimming station 16 where the workpiece is portioned and/or trimmed in accordance with the cutting path that has been predetermined by the computer. It is to be understood that the word "portion" or "portioned" shall also refer to "trim," "trimmed" and/or "cut." Next, the portioned workpiece is carried by the conveyor to an offloading section 17 for removing the portioned workpiece from the conveyor and placing the workpiece on a take-away conveyor or other location (not shown).

Describing the present invention in more detail, at scanning station 14 the scanning of workpieces can be carried out using a variety of techniques, including a video camera to view a workpiece illuminated by one or more light sources. Light from the light source is extended across the moving conveyor to define a sharp shadow or light stripe line, with the area forward of the transverse beam being dark. When no workpiece is being carried by the conveyor, the shadow line/light stripe forms a straight line across the conveyor belt. However, when a workpiece passes across the shadow line/light stripe, the upper, irregular surface of the workpiece produces an irregular shadow line/light stripe as viewed by a video camera directed downwardly on the workpiece and the shadow line/light stripe. The video camera detects the displacement of the shadow line/light stripe from the position it would occupy if no workpiece were present on the conveyor. This displacement represents the thickness of the workpiece along the shadow line/light stripe. The length of the workpiece is determined by the length of time that shadow lines are created by the workpiece. In this regard, an encoder may be integrated into the conveyor structure, with the encoder generating pulses at fixed time intervals corresponding to the forward movement of the conveyor.

In lieu of a video camera, the scanning stations may instead utilize an x-ray apparatus for determining the physical characteristics of the workpiece, including its shape, mass, and weight. X-rays may be passed through the object in the direction of an x-ray detector 60. Such x-rays are attenuated by the workpiece in proportion to the mass thereof. The x-ray detector 52 is capable of measuring the intensity of x-rays received thereby after passing through the workpiece. This information is utilized to determine the overall shape and size of the workpiece, as well as the mass thereof. An example of such an x-ray scanning device is disclosed by U.S. Pat. No. 5,585,603, incorporated by reference herein in its entirety.

The data information measured/gathered by the scanning devices is transmitted to the control system, which records the location of the workpiece on the conveyor as well as the shape and other parameters of the workpiece. With this information, along with previously gained information, the computer of the control system determines how to optimally portion or trim the workpiece at the portioning station 16.

From the scanning station 14, the conveyor 12 advances the workpiece WP to cutting station 16. By the time the workpiece has reached this location, the computer, receiving data from the scanning station 14, has determined how to optimally portion or trim the workpiece at the cutting station.

The portioning/trimming may be carried out by various types of cutting devices including high-pressure water jets as disclosed in U.S. Pat. Nos. 4,875,254, 5,365,186 and 5,868,056. Other types of cutting devices may be utilized, including band saws, reciprocating saws, circular saws, guillotine knives, and lasers. Workpieces can be portioned in accordance with desired portion sizes, portion weights, portion shapes, portion thickness, maximum fat content or other parameters. Workpieces can be trimmed to remove excess fat or excess bones or foreign matter.

At pickup station 17 the portioned workpieces are removed from the conveyor 12. Such removal may be carried out manually or automatically using a mechanical pickup device (not shown). If an automatic pickup device is utilized, the control system of the present invention tracks the location of the workpiece on the conveyor 12 through the entire travel of the workpiece along the conveyor. Once picked up from the conveyor, the workpiece can be transported to a desired location, for example, to a take-away conveyor for either further processing, storage, etc. A detailed description of a pickup device suitable for use in the present invention is disclosed in co-pending U.S. patent application Ser. No. 09/619,423 filed Jul. 19, 2000 and commonly assigned, which is explicitly incorporated herein.

Figure 2:
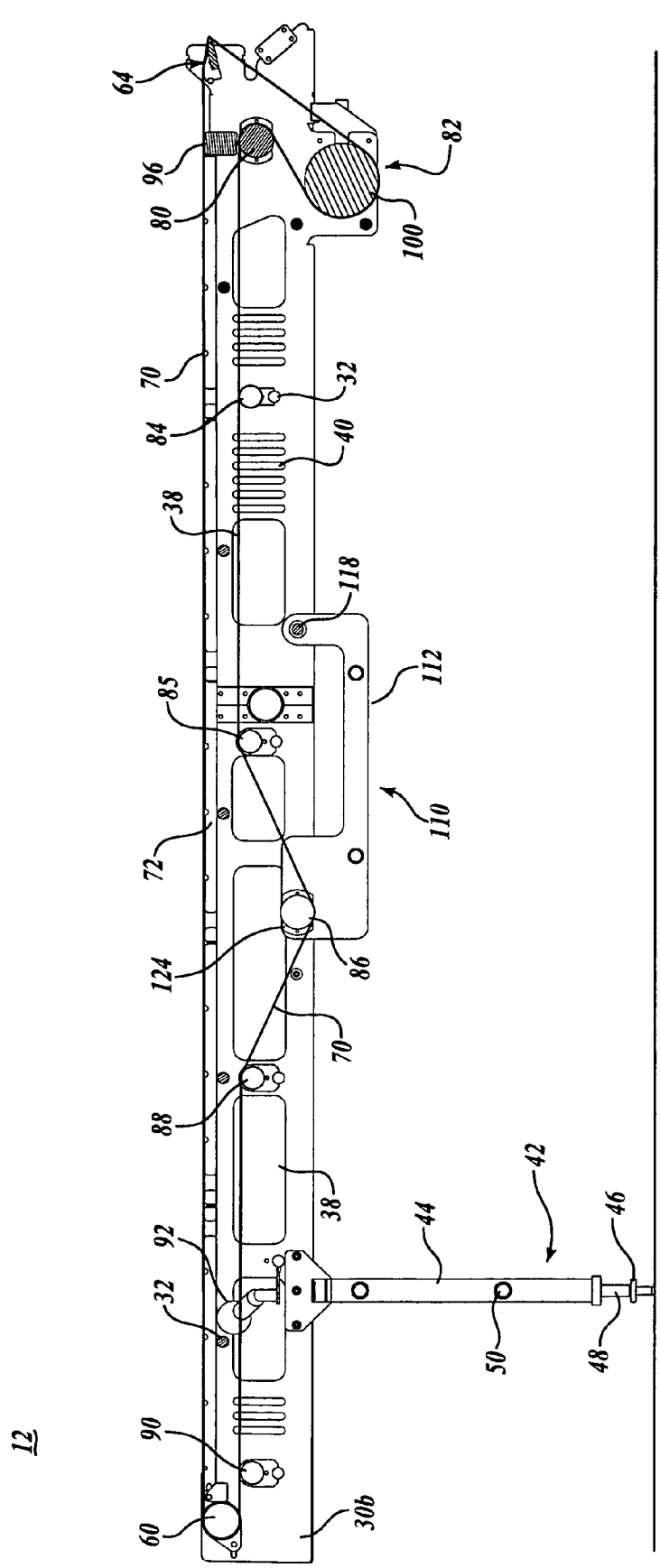
FIG. 2 is a side elevational view of an infeed and scanning portion of the conveyor system.
Figure 3:
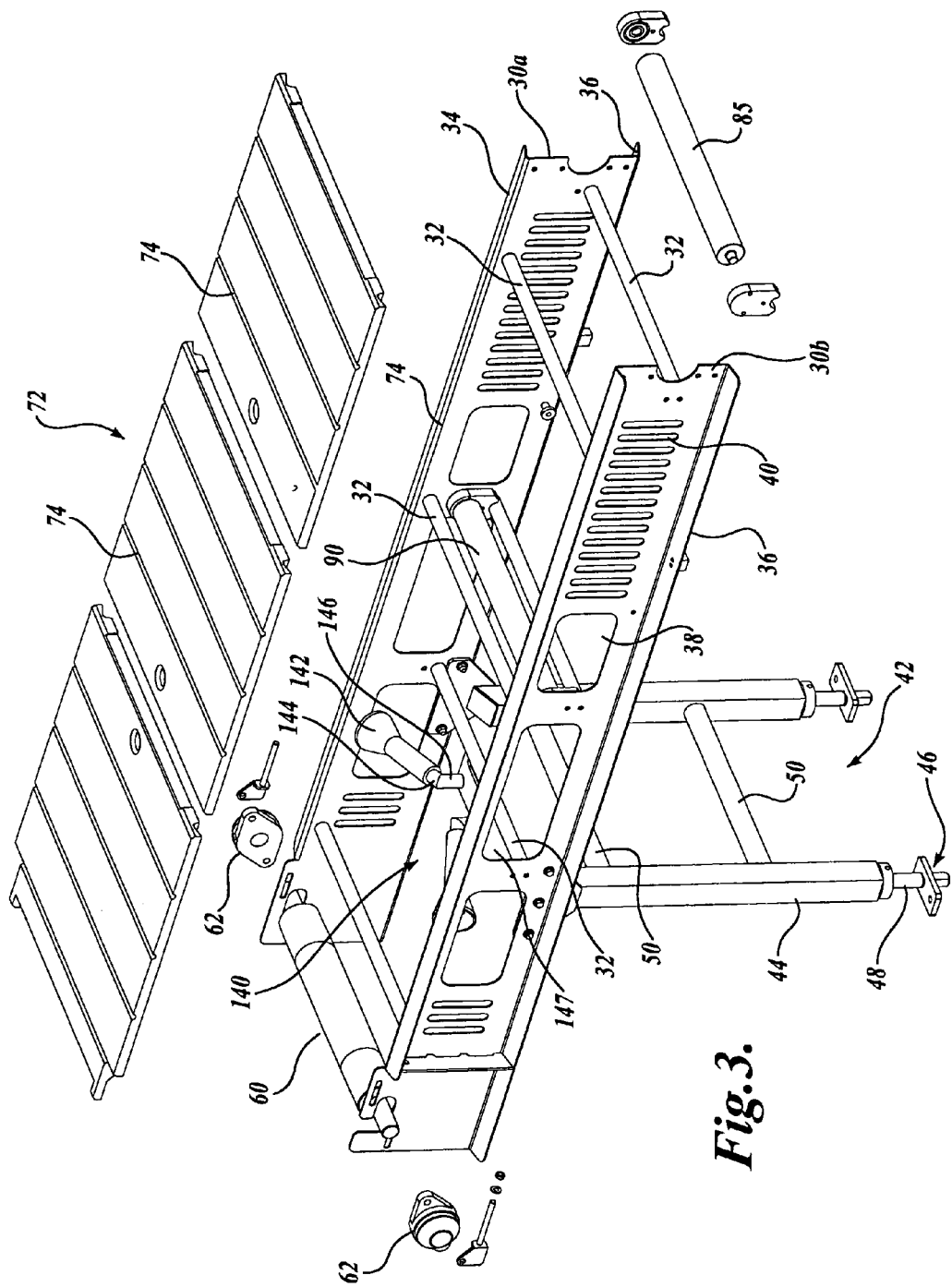
FIG. 3 is an exploded isometric view of an upstream portion of FIG. 2.
Figure 4:
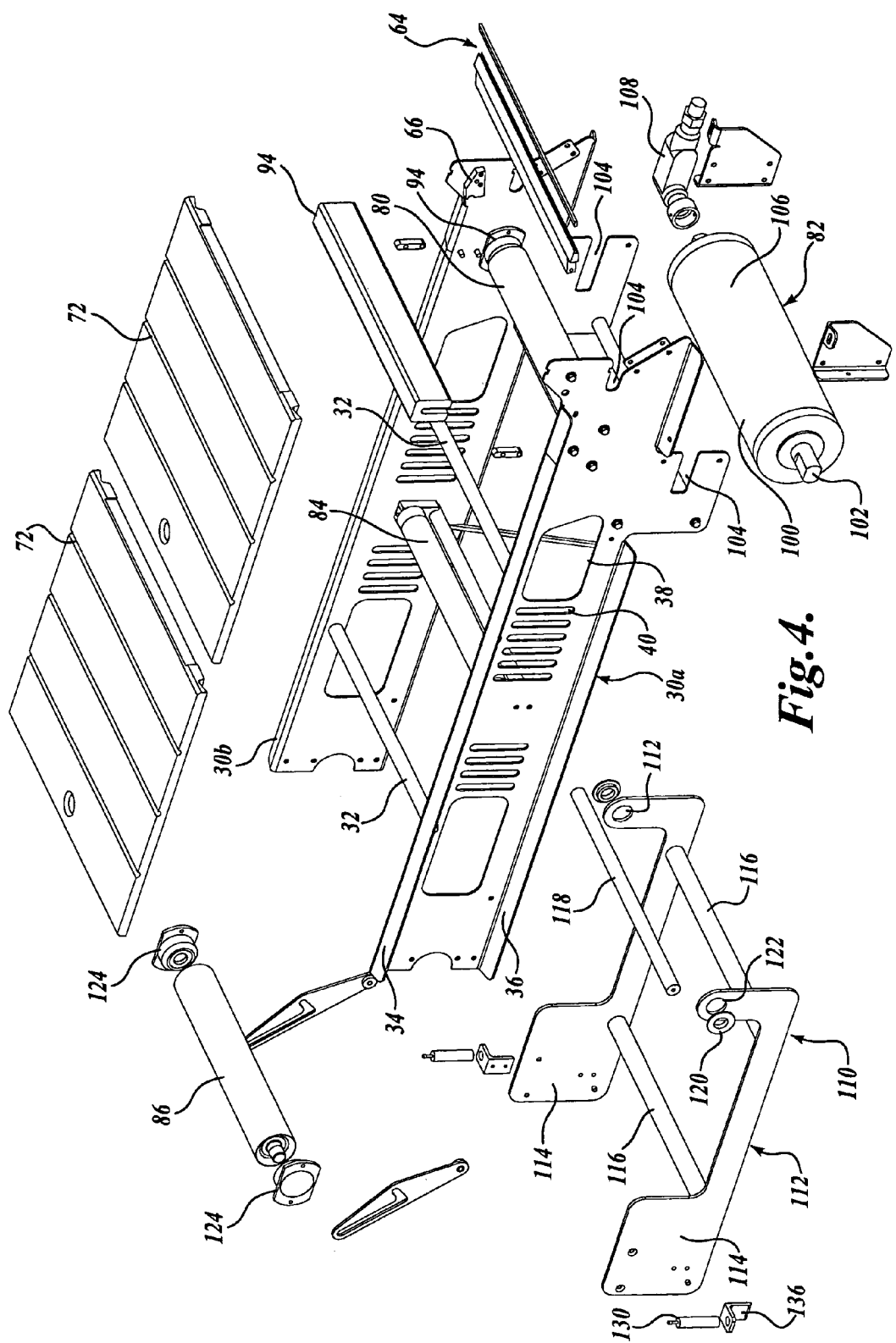
FIG. 4 is a view similar to FIG. 3, illustrating the section of the infeed portion of the conveyor located immediately downstream from the conveyor portion shown in FIG. 3.

Next, focusing on conveyor 12, the conveyor consists of two major sections, an infeed/scanning section 18, see FIGS. 2–4 and a cutting/outfeed section 22, see FIGS. 5A–8. Focusing initially on the infeed/scanning section, referring to FIGS. 2–4, this section of the conveyor 12 includes longitudinal side panels 30*a* and 30*b* disposed in parallel, spaced-apart relationship to each other by a series of transverse spreader bars 32 that are secured to the inside surfaces of the side panels 30*a* and 30*b* by appropriate fasteners, which may be in the form of hardware members or other types of fasteners (not shown). As most clearly illustrated in FIGS. 3 and 4, the side panels 30*a* and 30*b* are formed with integral upper and lower flanges 34 and 36, which add to the stiffness and structural integrity of the side panels. Also, a series of openings 38 are formed in the side panels 30*a* and 30*b* for access, and a series of louvers 40 are also formed in the side panels to provide ventilation therein while retaining the stiffness and structural integrity of the side panels. It is to be understood that the side panels can be of numerous other constructions without departing from the spirit and scope of the present invention.

The upstream end of the conveyor section 18 is supported by a leg structure 42 composed of a pair of downwardly depending, transversely spaced-apart legs 44, extending downwardly from the underside of side panels 30*a* and 30*b* to terminate at feet portions 46 which are affixed to the lower end of rods 48 that are threadably engaged to the lower end of legs 44 so as to be able to adjust the overall length of the legs, which may be convenient to level the conveyor 12. A pair of cross bars 50 may extend transversely between the legs 44 for reinforcement purposes.

An infeed roller assembly 60 is rotatably mounted at the far infeed end of the conveyor section 18 (left hand end shown in FIGS. 2 and 3) by bearing assemblies 62 which are fastened to side panels 30*a* and 30*b* by hardware members. A nose assembly 64 is located at the opposite end of the conveyor section 18 by brackets 66 secured to the side panels 30*a* and 30*b* by appropriate fasteners. An endless belt 70 is trained over roller assembly 60 and nose assembly 64. As shown in FIG. 4, the belt 70 makes a rather sharp turn around the downstream end of the nose assembly 64.

The endless belt 70 may be of various constructions. In one form, the endless belt is composed of a fabric material having an exterior impervious coating. Also, the coating may be white in color so as not to interfere with the scanning of work product carried by the endless belt, especially when using optical scanning techniques. Also, rather than being of "solid" or sheet construction, the endless belt may be composed of a series of parallel lines or wires moving in unison. An example of such conveyance belt is disclosed in U.S. Pat. No. 6,315,100, incorporated herein by reference.

A series of belt support panels 72 are supported by the side panel upper flanges 34. A recess or shoulder can be formed in the upper flanges 34 for receiving the side edge portions of the support panels 72, thereby to form a seat for the panels and to restrain the panels in the lateral direction. The support panels 72 are generally rectangular or square in shape and can include transverse grooves 74 to receive and accumulate lubricant or other material disposed on the underside of the endless belt 70. The support panel 72 can be composed of any appropriate material, for example, a high density plastic material.

After passing over the relatively sharp downstream edge of nose assembly 64, the endless belt extends downwardly and back in the upstream direction around a drive roller or pulley assembly 82, then over the upper side of an idler roller or pulley 80 located above and downstream of the drive roller assembly. In this manner, the belt wraps more than 180° around the drive roller assembly. Next, the belt extends over a series of two idler rollers or pulleys 84 and 85 and then beneath the underside of a tensioning roller or pulley 86, then over a pair of idler rollers or pulleys 88 and 90, and thereafter around the infeed roller assembly 60. As shown in FIGS. 2 and 4, the furthest downstream idler roller 80 is relatively large in diameter, and is fastened to the inside walls of the side panels 30*a* and 30*b* by bearing assemblies 94. A keeper bar extends transversely across the conveyor at an elevation just above roller 80 to retain the belt 70 on the roller 80 and also to serve as a support for the belt 70 between the downstream end of support panels 72 and the nose assembly 64.

As also shown in FIG. 4, the drive roller assembly 82 includes a relatively large diameter drive roller or pulley 100 axled on a shaft 102 extending outwardly from the ends of roller to be received within horizontal slots 102 formed in the side panels 30*a* and 30*b*. As noted above, the roller assembly 82 is used to power or drive the endless belt 70 by frictional engagement therebetween. To this end, a coating 106 may be applied to the exterior of the roller 100 thereby to increase the coefficient of friction between the drive roller and the endless belt 70. The coating may be composed of a rubber or rubber-like material.

The drive roller 100 may be powered by numerous methods, including by a drive motor located internally within the roller assembly 82. Such drive motors are articles of commerce. One example of such drive motor is sold under the trademark Dura-Drive Plus™ by Sparks Belting Company of Grand Rapids, Mich. Also the roller assembly 82 can include an internal encoder, not shown. Electrical lines can be routed to and from the encoder within the roller assembly 82 through an elbow 108 which is coupled to the roller axle 102. Such encoders are capable of providing over 1,000 "counts" per revolution of the drive motor, and are articles of commerce. As such, the position of the endless belt 70 along the conveyor 12 can be ascertained with precision.

A desired level of tension is applied to the endless belt 70 by a tension assembly 110 composed of a pivot frame 112 which pivotally supports a tension roller or pulley 86 relative to the conveyor 12. In this regard, the pivot frame 112 consists of two side panels 114 disposed in parallel, spaced apart relationship to each other by at least two spacer bars 116 which may be affixed to the side panels by any convenient means. The downstream end of the pivot frame 112 is pivotally mounted to side panels 30a and 30b by an axle 118 closely engageable within bushings 120 having reduced diameter hub portions that seat with circular openings 122 formed in the side panels 114 of the pivot frame 112. The tension roller or pulley 86 is anti-frictionally mounted to the opposite end portion of the pivot frame 112 by bearing assemblies 124, which in turn are secured to side panels 114. As will be appreciated, the weight of the tension roller 186 is applied to the lower run of the endless belt 70 by virtue of the pivot frame 112 pivoting about axle 118. It will be appreciated that, rather than relying on the weight of the tension roller 186 to apply tension to the endless belt 70, springs or other devices can be used in addition to solely the weight of the roller. In this regard, such springs can act on the pivot frame, for instance by being interconnected between the pivot frame and the conveyor 12. Also, in accordance with the present invention, the pivot frame can be replaced with other types of structures, for example, a slide mechanism or a scissors/jack-type mechanism.

A pair of dampeners 130 are mounted on brackets 136 which in turn are secured to the outer surfaces of pivot frame side panels 114. From the brackets 136, the dampeners extend upwardly to bear against the undersides of side panel lower flanges 36. The dampeners 130 may include a hydraulic dampening fluid or a dampening fluid of other compositions. The dampeners are designed to resist and dampen the upward movement of the tension roller 86 while allowing the tension roller to move freely in the downward direction. In this manner, the dampeners 130 are capable of dampening out vibrations in the endless belt 70. During operation of conveyor 12, it is not uncommon for the belt to vibrate at a resonant frequency of the belt. The dampeners 130 dampen such vibration. Dampeners 130 are articles of commerce.

The endless belt 70 is maintained centered on infeed roller 60 and drive roller 82 by a centering mechanism 140, which consists of a pair of tapered rollers 142 rotatably mounted on a shaft 144 that cantilevers outwardly and diagonally, upwardly from a post 146 mounted on a crossplate 147, which in turn is supported by a crossbar 42, see FIG. 3. The tapered rollers f142 also extend in the slightly upstream direction relative to the length of the conveyor 12. By this orientation of the tapered rollers 42, such rollers apply a centering force on the lower run of the belt 70, thereby maintaining the belt centered relative to the conveyor section 18.

Figure 5A:
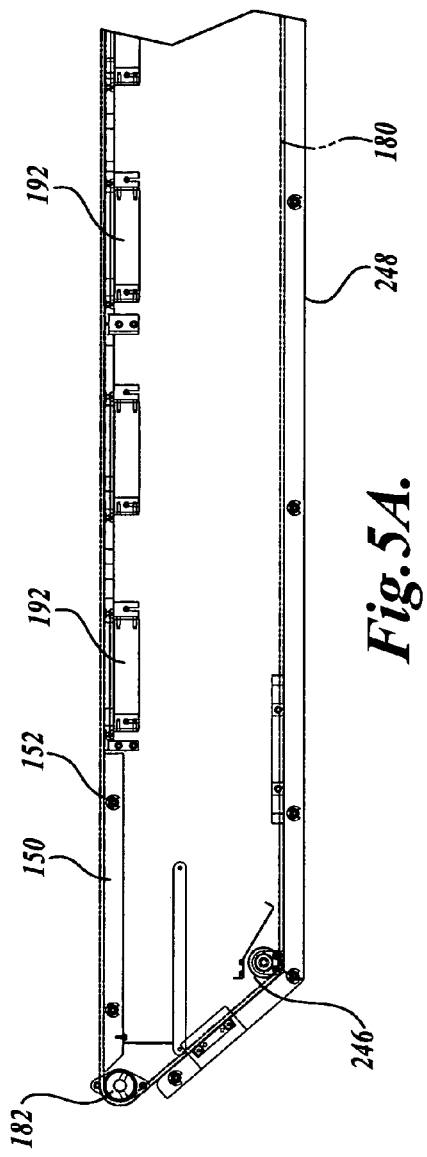
FIGS. 5A and 5B in combination compose a side elevational view of the section of the conveyor of the present invention located adjacently downstream of the section shown in FIG. 2, with parts removed to improve the clarity of the construction of this conveyor section.
Figure 5B:
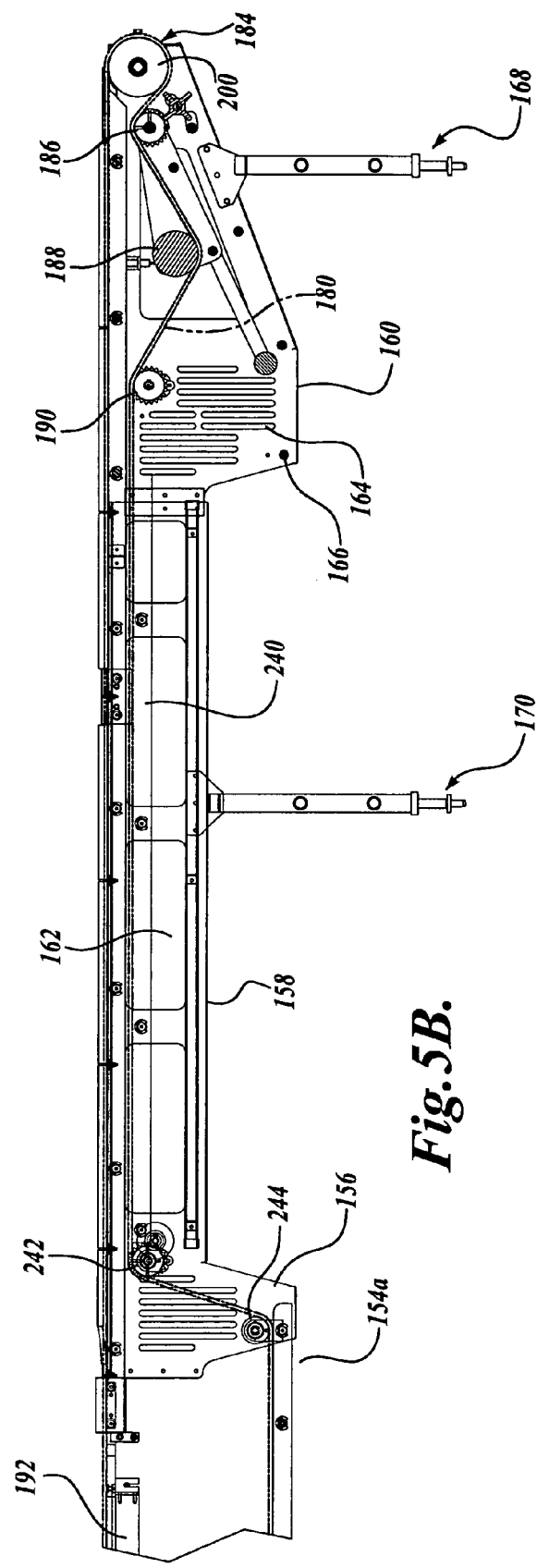
Figure 6:
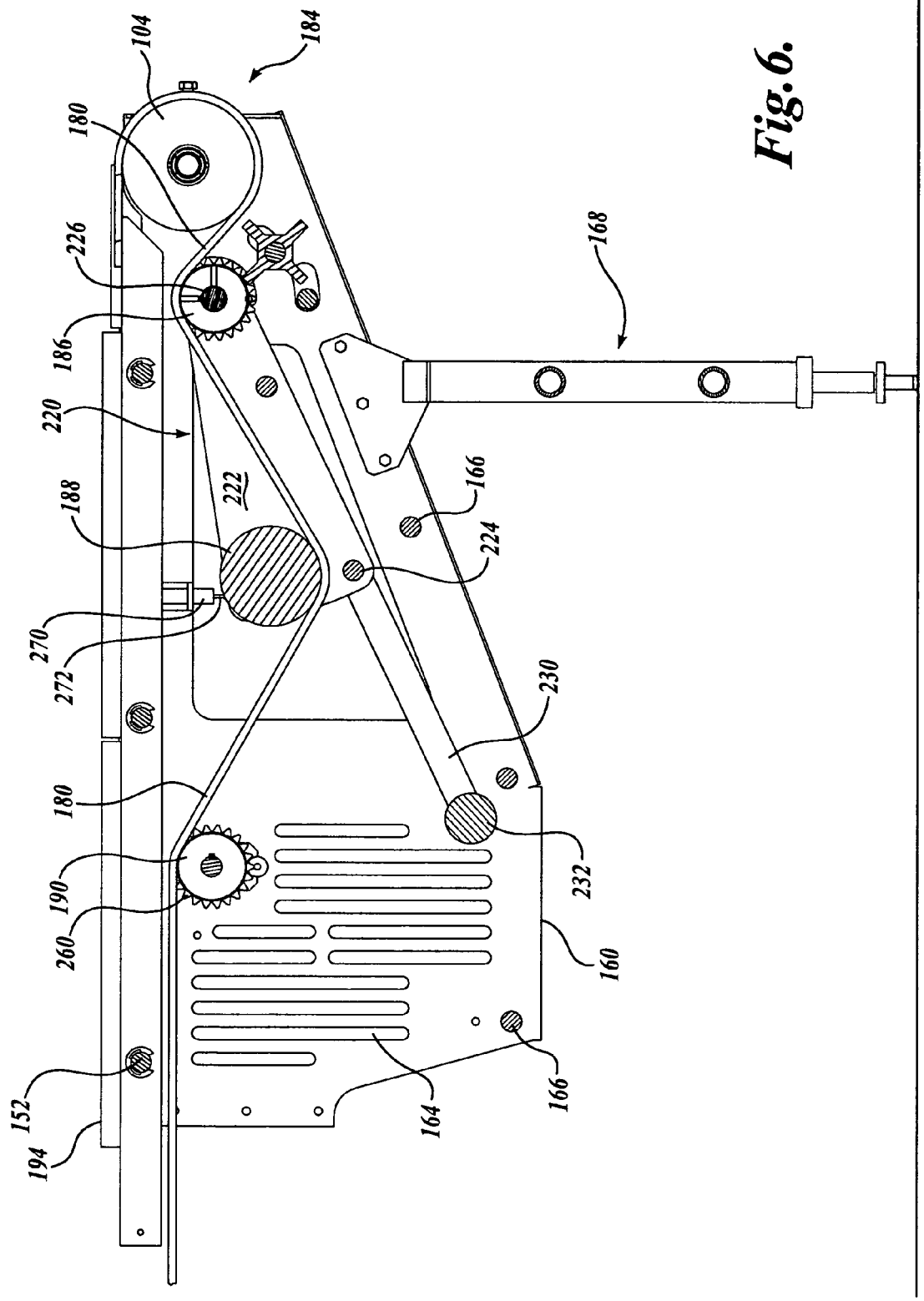
FIG. 6 is a side elevational view of the downstream end section of the conveyor portion shown in FIG. 5B.
Figure 7:
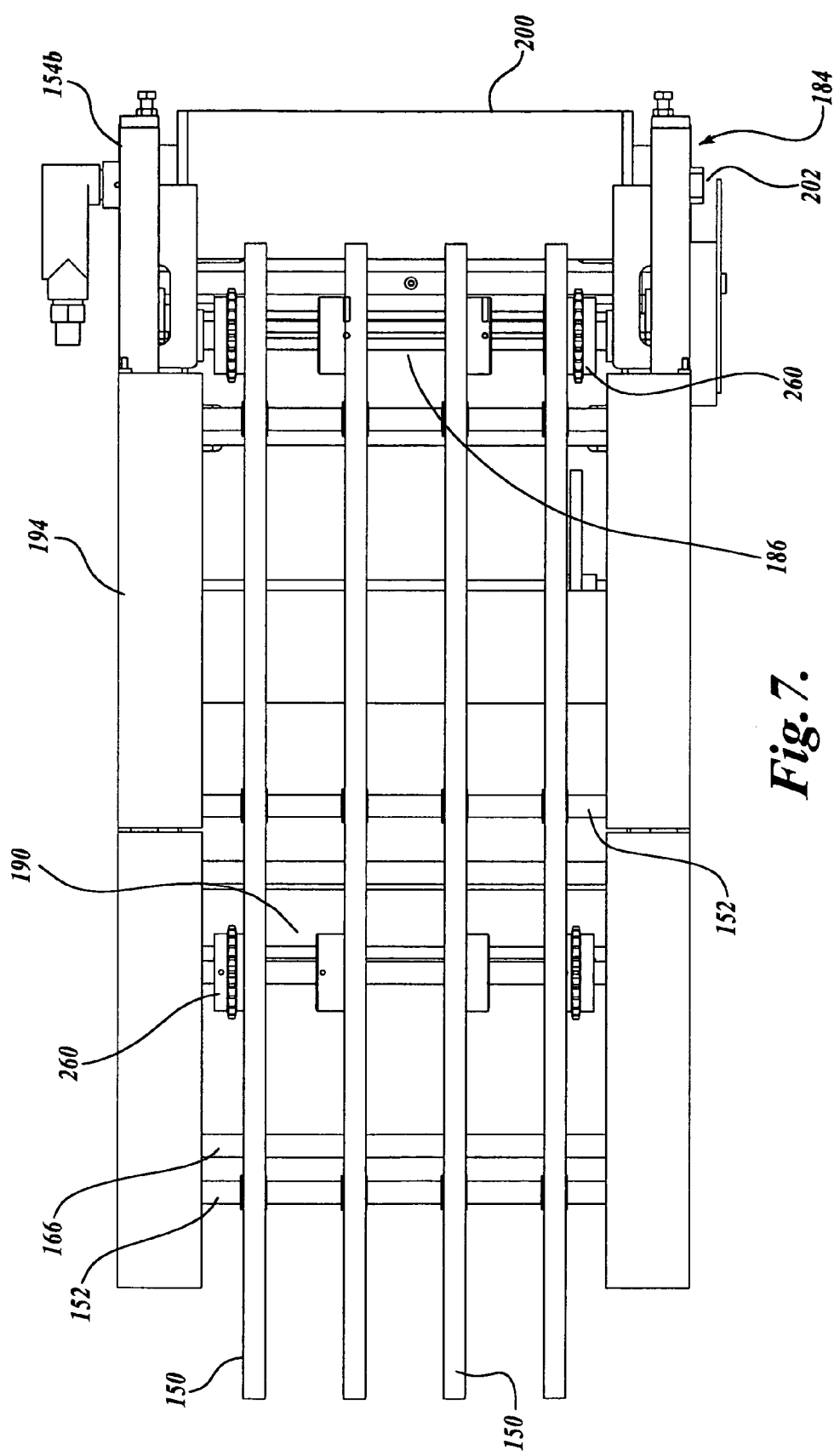
FIG. 7 is a top view of FIG. 6.
Figure 8:
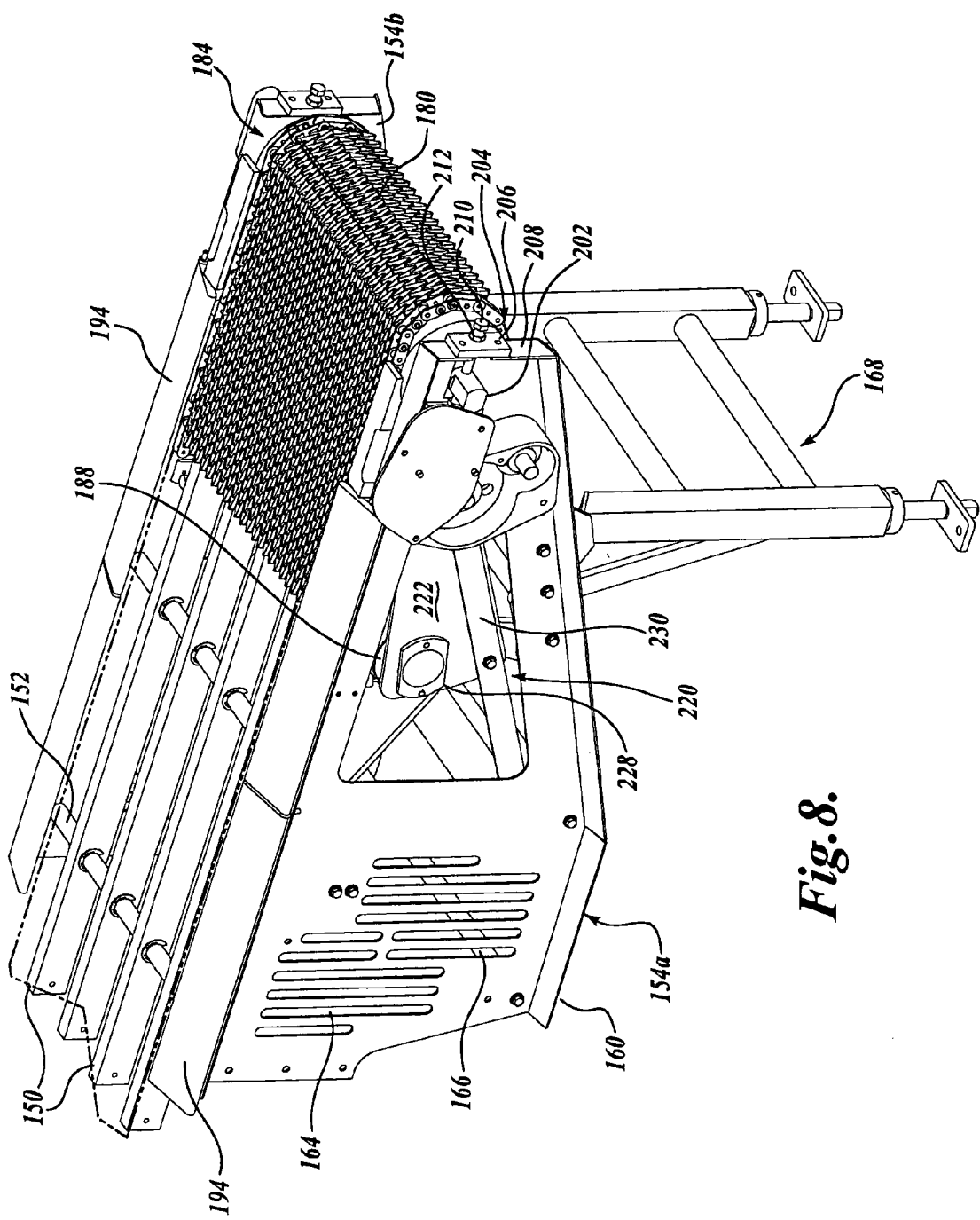
FIG. 8 is an isometric view of FIG. 6.

Next, focusing on the cutter/outfeed conveyor section 22, as shown in FIG. 1 and FIGS. 5A–8, this section of conveyor 12 extends from the distal or downstream end of endless belt 70 and thus is located partially within the scanning station 14. From this location, the conveyor section 22 extends through the cutting station 16 and then to the outfeed/offload station 17. The conveyor section 22 is constructed somewhat differently than the conveyors section 18, described above. As shown in FIGS. 7 and 8, the conveyor section 22 includes a plurality of parallel belt support bars 150 extending longitudinally of the conveyor section 22. The bars 150 are supported and retained in position by a series of round crossbars 152 that extend transversely relative to the length of the conveyor to be anchored to the side panels 154a and 154b of the conveyor section. As shown in FIGS. 5A and 5B, the side panels 154a and 154b may be formed from various sections, including a section 156 located beneath cutter station 16 and the adjacent portion of scanning station 14, and the intermediate section 158 located downstream of the cutter station 116 and a distal section 160 located at the far, downstream end of the conveyor section 22. As in side panels 30a and 30b, the side panels 154a and 154b may be formed with openings 162, as well as louvers 164 for ventilation. The side panels may also include upper and lower flanges in the manner of flanges 34 and 36 of side panels 30a and 30b.

The frame portion of the conveyor section 22 may include additional crossbars 166 that extend along the lower portions of the side panels 154a and 154b, at least along the side panel section 160. The conveyor section 22 may be supported by leg assemblies 168, 170, and additional leg assemblies as required. Such leg assemblies may be constructed similarly to leg assembly 42, described above. It is to be appreciated that the frame portion of conveyor section 22 can be of various constructions without departing from the spirit or scope of the present invention.

An endless belt 180 is supported by and carried by the conveyor section 22. Such endless belt is trained about an upstream, end roller or pulley 182 and about a downstream, end drive roller or pulley assembly 184, mounted at the far downstream end of conveyor section 22. From drive roller assembly 184, the belt travels upstream by extending over an idler roller or pulley assembly 186, a tension roller or pulley assembly 188, and then a further idler roller assembly 190. Additional idler rollers, discussed below, may be utilized to support the lower run of the belt 180 as it makes its way back to end roller 182.

The endless belt 180 may be of various constructions. If water jets are utilized for cutting the workpieces, then preferably the endless belt 180 is of "open end" construction sufficient to support the workpiece, but also allowing the water jet to pass downwardly through the belt to collection pans 192 located beneath the belt 180. In this regard, the belt 180 may be composed of flat wire material formed to define picket sections that extend transversely across the conveyor. The flat wire material is edgewise in the upright direction to provide structural integrity, and also so that, from the top view, the belt is substantially of open construction. The transverse pickets may be of various shapes, such as in the shape of a square wave, shown in U.S. Pat. No. 2,619,306 (see FIG. 9), or a "V" wave, as shown in U.S. patent application Ser. No. 10/068,470 (see FIG. 10), co-owned by the assignee of the present application and incorporated herein by reference. It is to be understood that the endless belt 180 can be of various constructions without departing from the spirit or scope of the present invention.

As shown in FIGS. 6–8, side covers 194 extend along the upper flange portions of the conveyor section 22, at least downstream from the cutter station 16. The side covers 194 extend over the adjacent side edges of belt 180 to provide protection for operators or work persons who may be manually removing work product from the conveyor at offload station 17. The covers 184 may be easily removed or retracted to allow cleaning of the conveyor section 22. In this regard, an appropriate mounting arrangement may be utilized between the side covers 184 and the top flange of the conveyor side panels 154a and 154b.

The end roller 182 at the leading end of conveyor section 22, is mounted to the conveyor just downstream of the nose assembly 64 of the conveyor section 18 to minimize the gap between the end of the endless belt 70 and the beginning of the endless belt 180, see FIG. 2. At the opposite end of the conveyor section 22, the drive roller or pulley assembly 184 includes a drive roller or pulley 200 that is mounted on a supporting axle 202. The ends of the axle 202 project outwardly from the ends of the roller 200 and are received within a slot formed in side panel sections 160, and are retained in place by a keeper assembly 204, shown in FIG. 8. The keeper assembly includes a keeper plate 206 mounted to the end flange 208 of side panels 160, and a tightening bolt 210 threadably engaged with the keeper plate 206 and extending therefrom to bear against the rear side of axle 202. A lock nut 212 may be utilized to keep the tightening bolt 210 from backing out relative to the keeper plate.

As in drive roller assembly 82, the drive roller 200 may be powered by an internal motor, not shown. In addition, an encoder, not shown, may be incorporated into the structure of the drive roller assembly 184 in the same manner as in the drive roller assembly 82.

As shown in the drawings, the drive roller 20 is of relatively large diameter. In this regard, the diameter of the drive roller may be about six inches, or maybe larger or smaller, perhaps in the range of four to ten inches. Also, to enhance the precision with which the endless belt 80 is driven, the roller 200 may be carefully manufactured to ensure that it is truly round. This may be achieved by precision grinding the exterior surface of the roller 200.

As noted above, from the drive roller 200 the return run of endless belt 180 extends over idler roller or pulley assembly 186, which spans between the conveyor frame side panels sections 160. Thereafter, the belt 180 extends beneath the tension roller or pulley 188 of the tensioning assembly 220, which is illustrated most clearly in FIGS. 6 and 8. Tensioning assembly 220 includes side plates 222, which are disposed in spaced parallel relationship to each other by a series of crossbars 224. The tensioning assembly is pivotally mounted to the conveyor frame side panels 154a and 154b by the same axle 226 used to mount the idler roller 186. Thus, the tensioning assembly 220 is pivotal about the axle 226. At the opposite end portion of the side plate 222 is mounted tensioning roller 188 through the use of bearing assemblies 228. It will be appreciated that the weight of the tensioning roller 188 presses downwardly on the return run of belt 180 and applies sufficient tension to the belt so that the belt remains in secure frictional engagement with the drive roller 200 during the operation of the present invention.

An extension arm 230 extends downwardly in the upstream direction from each of the side plates 220, with the projecting distal ends of the arms 230 connected to a crossbar 232. This arrangement enables more tension or load to be applied to belt 180. Rather than being pivotally mounted on the conveyor 12, the tensioning assembly could be slideably or otherwise mounted on the conveyor, with the drive roller 200 still applying a substantial tensioning load on the endless belt. Also, the tensioning of the belt can be accomplished by other means, such as described above with respect to tensioning assembly 110.

From the tensioning roller 188, the belt 180 extends over an idler roller 190 which is at about the same elevation as idler roller 186, and also is mounted to the side panels 154a and 154b, see FIG. 5B. From the idler roller 190, the belt 180 rides over a series of parallel support bars 240 that extend along the portion of conveyor section 22 disposed downstream and outwardly of the cutting station 16, see FIG. 5B. Also referring to FIG. 5A, next, the endless belt 180 extends around an upper idler roller 242 and then extends downwardly to wrap around the underside of a lower idler roller 244, and then extends upstream to wrap around the underside of a further lower idler roller 246. Between the idler rollers 244 and 246, the endless belt is supported by parallel bars 248, forming part of the frame structure of the conveyor section 22. From the lower idler roller 246, the belt 180 is trained around end roller 182.

Figure 9:
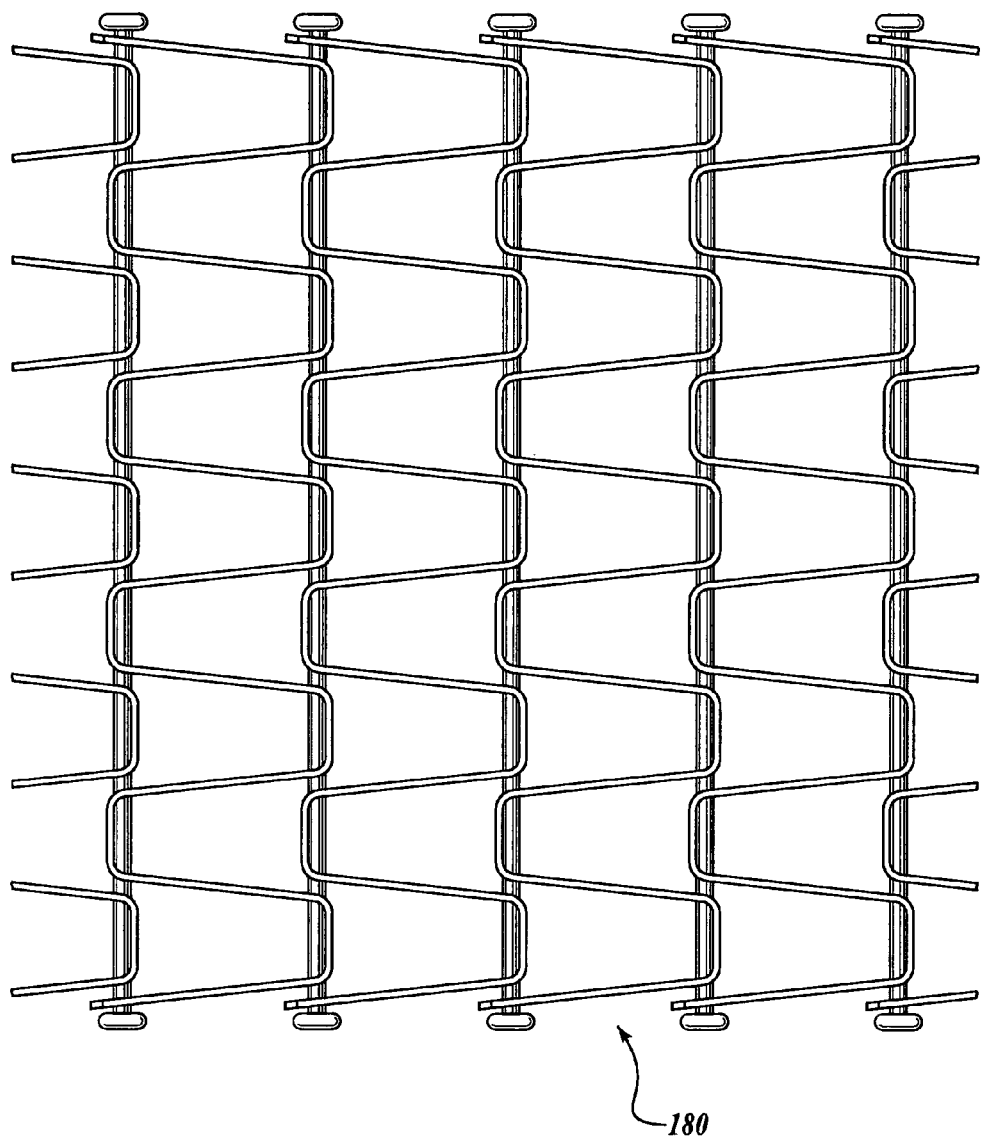
FIG. 9 is an enlarged fragmentary top view of a portion of a flat wire belt that may be used in conjunction with the present invention.
Figure 10:
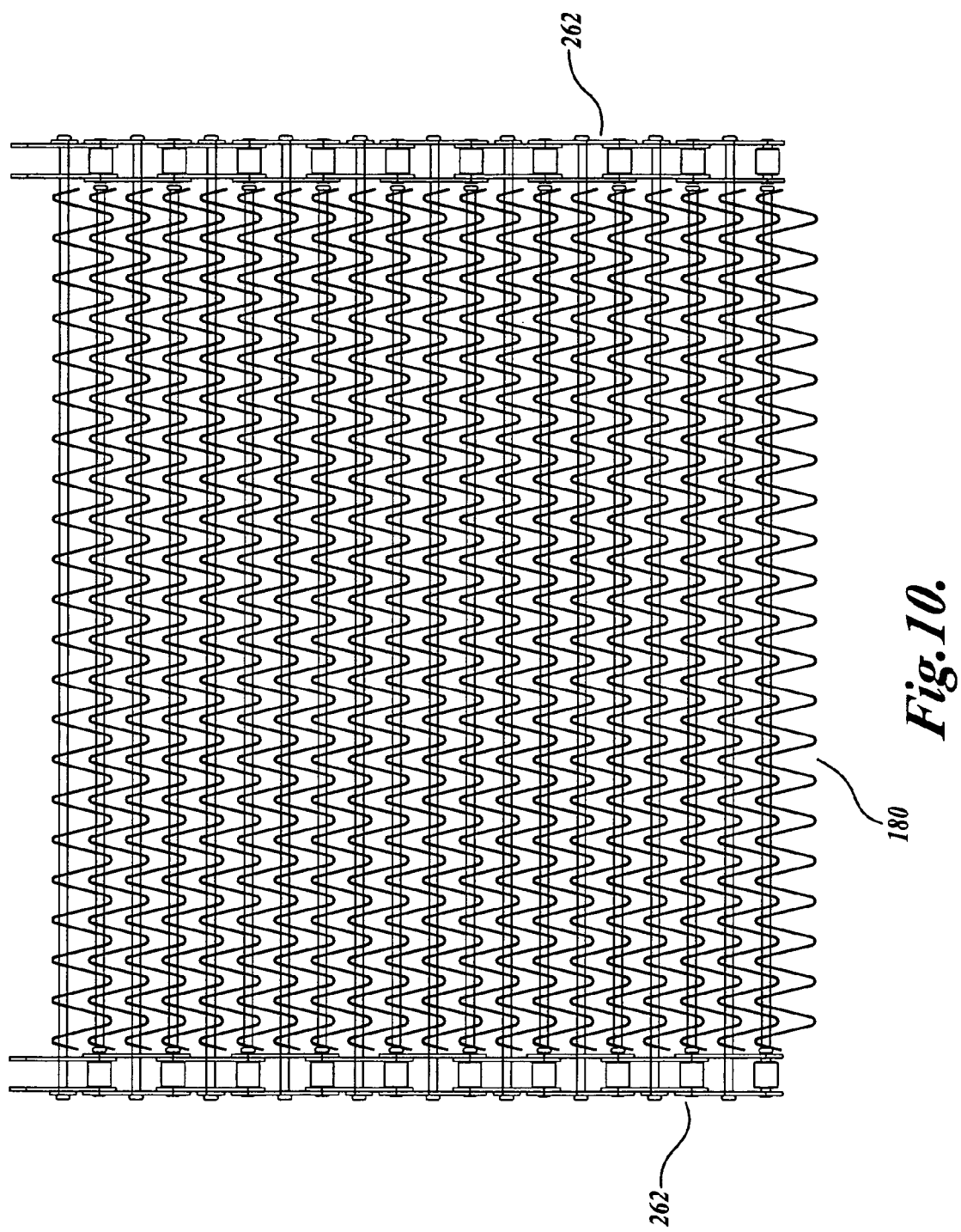
FIG. 10 is an enlarged, fragmentary top view of another flat wire endless belt that may be used in conjunction with the present invention.

The endless belt 180 is maintained in alignment relative to the drive roller 200, the end roller 182, and the remainder of the conveyor section 22 by sprockets 260 which may be mounted on the same axles that support the various idler rollers, for example, idler rollers 186, 190, and 246. The sprockets 260 engage the side portions of the endless belt as shown in FIG. 9. Alternatively the belt may include a roller chain 262 extending along the side edges of the belt, see FIG. 10. Although chain 262 is shown disposed along both side edges of the endless belt 180, in certain situations it may be possible to utilize a single chain that extends along only one side of the endless belt. Also, other techniques may be utilized to maintain the alignment of the chain 180.

As in conveyor section 18, the conveyor section 22 also includes a dampening arrangement to dampen vibrations that may occur in the endless belt 180. As noted above, such vibrations may occur during operation of conveyor 12 seeking to vibrate the belt at its resonant frequency. When such vibrations in the belt occur, the tension roller 188 is likewise raised and lowered, thereby causing the side plates 220 to pivot about axle 226. Such pivoting movement of the side plates is dampened by dampeners 270 that are mounted on the frame side panels 154a and 154b to extend downwardly toward the upper edges of the side plates 222, see FIG. 6. Dampeners 270 have piston rods 272 that extend downwardly to bear against the upper edge of the side plates 220. The dampeners 270 are designed to allow the side plates 222 to move downwardly so as to maintain tension on the belt 180, including as the belt stretches during normal use. However, the dampeners 270 resist the upward movement of the side plates 220 and apply a dampening force to any such upward movement. As a consequence, the speed of the endless belt 180 is maintained substantially constant.

The control system of the present invention controls the speeds of the drive roller assemblies 82 and 180. The control system seeks to maintain the speeds of the endless belts 70 and 180 at substantially the same speed. As a consequence, the accuracy with which workpieces are portioned is improved over prior art portioning systems. Moreover, the friction drive roller assemblies for both endless belts 70 and 180 facilitate maintaining the speeds at which the endless belts travel substantially constant, especially relative to prior art systems wherein the endless belts of a portioning conveyor may be driven through drive sprockets that engage chains disposed along the sides of the endless belt. In that situation, the speed of the belt increases and decreases with each engagement and disengagement of the sprocket teeth with a chain link. Also, in such arrangements there is a pitch-to-pitch variation in the links of the chain as well as in the pitch of the conveyor belt. In sum, the present invention is calculated to improve the accuracy with which workpieces are trimmed or portioned, which can be of great significance, especially if the workpieces are of inherently high value, or if the workpieces are being cut into relatively small portions.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A precision drive system for a conveyor for conveying work products past at least one processing station, the conveyor having a longitudinal frame and an endless belt, the precision drive system comprising:

(a) friction drive pulley about which the endless belt is trained, the endless belt being driven by the belt drive pulley through frictional engagement with the belt drive pulley;

(b) a tensioning roller located intermediate the ends of the frame for applying a tension load on the endless belt;

(c) a pivot assembly for pivotally supporting the tensioning roller relative to the endless belt, the pivot assembly being mounted to the frame to allow the tensioning roller to move in a direction to apply a tension load on the endless belt, the pivot assembly generating a tensioning force acting on the tensioning roller in a direction substantially lateral to the adjacent run of the endless belt; and (d) a dampener acting on the pivot assembly to resist movement of the pivot assembly in a direction to dampen the tension load imposed on the endless belt.

2. The precision drive system according to claim 1, wherein a significant portion of the tension load applied to the endless belt by the tensioning roller is due to the weight of the tensioning roller being applied to the endless belt.

3. The precision drive system according to claim 1, further comprising a drive motor to drive the drive pulley, the drive motor being located within the interior of the drive pulley.

4. The precision drive system according to claim 3, further comprising an encoder incorporated into the drive pulley to monitor the rotation of the drive pulley.

5. The precision drive system according to claim 1, further comprising an alignment system mounted to maintain the endless belt in alignment with the drive pulley.

6. The precision drive system according to claim 1, wherein the endless belt includes fabric composition and the drive pulley further comprises frictional surface to enhance the frictional contact between the endless belt and the drive pulley.

7. The precision drive system according to claim 6, wherein the frictional surface comprises a coating applied to the exterior of the drive pulley comprised of a stiff, elastomeric material.

8. The precision drive system according to claim 1, wherein the endless belt is composed of flat wire material shaped to form sections extending transversely relative to the length of the endless belt.

9. The precision drive system according to claim 8, further comprising an alignment system for maintaining the endless belt aligned relative to the drive pulley, the alignment system comprising at least one sprocket rotatably mounted relative to the frame to engage the belt.

10. A precision drive system for a conveyor for conveying work products past at least one processing station, the conveyor having a longitudinal frame and an endless belt, the precision drive system comprising:

(a) a friction drive pulley about which the endless belt is trained, the endless belt being driven by the belt drive pulley through frictional engagement with the belt drive pulley;

(b) a tensioning roller located intermediate the ends of the frame for applying a tension load on the endless belt;

(c) a pivot assembly for pivotally supporting the tensioning roller relative to the endless belt, the pivot assembly being mounted to the frame to allow the tensioning roller to move in a direction to apply a tension load on the endless belt; and (d) a dampener acting on the pivot assembly to resist movement of the pivot assembly in a direction to dampen the tension load imposed on the endless belt, (e) further comprising an alignment system for maintaining the endless belt aligned relative to the drive pulley, the alignment system comprising at least one sprocket rotatably mounted relative to the frame to engage the belt, the alignment system further comprises a chain extending along at least one side of the endless belt and a sprocket rotatably mounted relative to the drive pulley to engage said chain.

11. A precision drive system for a conveyor for conveying work products past at least one processing station, the conveyor having a longitudinal frame and an endless belt, the precision drive system comprising:

(a) a friction drive pulley about which the endless belt is trained, the endless belt being driven by the belt drive pulley through frictional engagement with the belt drive pulley;

(b) a tensioning roller located intermediate the ends of the frame for applying a tension load on the endless belt;

(c) a pivot assembly for pivotally supporting the tensioning roller relative to the endless belt, the pivot assembly being mounted to the frame to allow the tensioning roller to move in a direction to apply a tension load on the endless belt; and (d) a dampener acting on the pivot assembly to resist movement of the pivot assembly in a direction to dampen the tension load imposed on the endless belt, (e) further comprising an alignment system for maintaining the endless belt aligned relative to the drive pulley, the alignment system comprising at least one sprocket rotatably mounted relative to the frame to engage the belt, wherein such sprockets are positioned adjacent an idler pulley on which the endless belt is trained.

12. A precision conveyor system for transporting work products through a plurality of processing areas, comprising:

an elongate conveyor frame structure;

a first endless belt having an infeed end and an outfeed end;

a first drive roller mounted on the conveyor frame structure about which the first endless belt is trained, the first drive roller driving the first endless belt through frictional engagement with the first endless belt; and a first belt tensioning and dampening system pivotally mounted on the conveyor frame structure for applying a tensioning load on the first endless belt to maintain adequate frictional engagement between the first endless belt and the first drive roller and to apply a dampening load on the first endless belt to dampen fluctuations in the tension load, the first belt tensioning and dampening system generating tensioning forces applied to the first belt tensioning and dampening system in a direction generally laterally to the portion of the first endless belt adjacent the first belt tensioning and dampening system.

13. The precision conveyor system according to claim 12, wherein the first belt tensioning and dampening system comprises: a first pivot frame mounted on the conveyor frame structure; and, a first tensioning roller engaged with the first endless belt rotatably, said first tensioning roller mounted on the first pivot frame at a location spaced from the mounting location of the first pivot frame to the conveyor frame structure.

14. The precision conveyor system according to claim 13, wherein the weight of the first tensioning roller is applied against the first endless belt by the pivoting action of the first pivot frame relative to the conveyor frame structure.

15. The precision conveyor system according to claim 12, further comprising a drive motor to drive the first drive roller, said drive motor being located within the interior of the first drive roller.

16. The precision conveyor system according to claim 15, further comprising an encoder disposed within the first drive roller to monitor the rotation of the first drive roller.

17. The precision conveyor system according to claim 12, further comprising an alignment system mounted on the conveyor frame structure to maintain the first endless belt in alignment with the first drive roller.

18. The precision conveyor system according to claim 12, wherein the first endless belt comprises fabric material, and the first drive roller comprises a frictional surface to enhance the coefficient of friction between the first drive roller and the first endless belt.

19. The precision conveyor system according to claim 12, wherein the first endless belt is composed of a plurality of pickets formed from flat wire disposed edgewise in the upright direction, said pickets extending transversely relative to the length of the first endless belt.

20. The precision conveyor system according to claim 19, further comprising an alignment system for maintaining the first endless belt in alignment with the first drive roller, the alignment system comprising at least one sprocket rotatably mounted relative to the drive roller to engage the first endless belt.

21. A precision conveyor system for transporting work products through a plurality of processing areas, comprising:
   an elongate conveyor frame structure;
   a first endless belt having an infeed end and an outfeed end;
   a first drive roller mounted on the conveyor frame structure about which the first endless belt is trained, the first drive roller driving the first endless belt through frictional engagement with the first endless belt;
   a first belt tensioning and dampening system pivotally mounted on the conveyor frame structure for applying a tensioning load on the first endless belt to maintain adequate frictional engagement between the first endless belt and the first drive roller and to apply a dampening load on the first endless belt to dampen fluctuations in the tension load; and
   further comprising an alignment system for maintaining the first endless belt in alignment with the first drive roller, the alignment system comprising at least one sprocket rotatably mounted relative to the drive roller to engage the first endless belt, wherein the alignment system further comprises a chain disposed along at least one side of the first endless belt and a sprocket rotatably mounted relative to the first drive roller and engageable with the chains.

22. The precision conveyor system according to claim 21, wherein said sprockets are mounted adjacent an idler pulley, said first endless belt being trained over the idler pulley.

23. A precision conveyor system for transporting work products through a plurality of processing areas, comprising:
   an elongate conveyor frame structure;
   a first endless belt having an infeed end and an outfeed end;
   a first drive roller mounted on the conveyor frame structure about which the first endless belt is trained, the first drive roller driving the first endless belt through frictional engagement with the first endless belt;
   a first belt tensioning and dampening system pivotally mounted on the conveyor frame structure for applying a tensioning load on the first endless belt to maintain adequate frictional engagement between the first endless belt and the first drive roller and to apply a dampening load on the first endless belt to dampen fluctuations in the tension load,
   a second endless belt having an infeed end adjacent the outfeed end of the first endless belt to receive work products from the first endless belt;
   a second friction drive roller about which the second endless belt is trained for deriving the second endless belt; and
   a drive control system for controlling the speeds of the first and second endless belts.

24. The precision conveyor system according to claim 23, wherein said drive control system synchronizes the speeds of the first and second endless conveyor belts to be at substantially the same speed.

25. The precision conveyor system according to claim 24, wherein the first endless belt is composed of fabric material and the second endless belt is composed of a plurality of pickets composed of formed flat wire material, such pickets extending transversely across the length of the second endless belt.

26. The precision conveyor system according to claim 23, further comprising a second endless belt tensioning and dampening system pivotally mounted for applying a tension load on the second endless belt to maintain adequate frictional engagement between the second endless belt and the second drive roller, and for applying a dampening force on the second endless belt upon fluctuations of the tension load on the second endless belt.

27. The precision conveyor system according to claim 26, wherein the second belt tension and dampening system comprising a second pivot frame mounted relative to the second drive roller, and a second tensioning roller engaged with the second endless belt and rotatably mounted on the second pivot frame at a location spaced from the mounting location of the second pivot frame relative to the second drive pulley.

28. The precision conveyor system according to claim 27, wherein the weight of the second tensioning roller is applied against the second endless belt by the pivoting action of the second pivot frame.

29. A conveyor system for carrying food products to be portioned through a scanning station and through a portioning station, comprising:
   (a) a endless belt having an infeed end and an outfeed end;
   (b) a drive roller in frictional engagement with the endless belt;
   (c) a drive system for driving the drive roller;
   (d) a belt tensioning and dampening system for applying a tension load on the endless belt of sufficient level to maintain frictional engagement between the endless belt and a drive roller, and for simultaneously dampening vibrations that occur in the endless belt;
   (e) wherein said tensioning and dampening system comprising a tensioning roller bearing against the endless belt; and
   (f) further comprising a subframe for supporting the tensioning roller relative to the endless belt, wherein said subframe is pivotably mounted on the conveyor frame, and the tensioning roller is anti-frictionally mounted on the subframe to bear against the endless belt.

30. The conveyor system according to claim 29, wherein the weight of the tensioning roller supplies a significant portion of the load that is applied on the first endless belt by the first tensioning roller.

31. The conveyor system according to claim 29, wherein the subframe is movable relative to the endless belt, to apply the tension load on the endless belt.

32. The conveyor system according to claim 31, wherein the subframe pivots relative to the endless belt under the influence of the weight of the tensioning roller.

33. The conveyor system according to claim 31, wherein the subframe is urged relative the endless belt under a load generated by a source that is in addition to the weight of the tensioning roller.

34. The conveyor system according to claim 29, wherein the drive system comprises a drive motor disposed within the drive roller.

35. The conveyor system according to claim 34, further comprising an encoder disposed within the drive roller.

36. The conveyor system according to claim 29, further comprising an alignment system mounted relative to the endless belt to maintain the endless belt in alignment with the drive roller.

37. The conveyor system according to claim 29, wherein the endless belt is composed of fabric material, and the drive roller comprises a frictional surface to enhance the frictional coefficient between the drive roller and the endless belt.

38. The conveyor system according to claim 29, wherein the endless belt is composed of formed flat wire material shaped to define a series of pickets extending across the length of the endless belt, said flat wire material disposed so that the plane of the wire material is in upright orientation.

39. The conveyor system according to claim 38, further comprising an alignment system for maintaining the endless belt aligned relative to the drive roller, the alignment system comprising at least one sprocket rotatably mounted relative to the drive roller to engage the endless belt.

40. A conveyor system for carrying food products to be portioned through a scanning station and through a portioning station, comprising:
   (a) a endless belt having an infeed end and an outfeed end;
   (b) a drive roller in frictional engagement with the endless belt;
   (c) a drive system for driving the drive roller;
   (d) a belt tensioning and dampening system for applying a tension load on the endless belt of sufficient level to maintain frictional engagement between the endless belt and a drive roller, and for simultaneously dampening vibrations that occur in the endless belt;
   (e) further comprising an alignment system for maintaining the endless belt aligned relative to the drive roller, the alignment system comprising at least one sprocket rotatably mounted relative to the drive roller to engage the endless belt; and
   (f) wherein the alignment system further comprises a chain extending along at least one side of the endless belt and a sprocket engageable with the chains.

41. A conveyor system for carrying food products to be portioned through a scanning station and through a portioning station, comprising:
   (a) a endless belt having an infeed end and an outfeed end;
   (b) a drive roller in frictional engagement with the endless belt;
   (c) a drive system for driving the drive roller;
   (d) a belt tensioning and dampening system for applying a tension load on the endless belt of sufficient level to maintain frictional engagement between the endless belt and a drive roller, and for simultaneously dampening vibrations that occur in the endless belt;
   (e) an alignment system for maintaining the endless belt aligned relative to the drive roller, the alignment system comprising at least one sprocket rotatably mounted relative to the drive roller to engage the endless belt; and
   (f) wherein said at least one sprocket is disposed adjacent the end of an idler pulley on which the endless belt is trained.

42. A conveyor system for carrying food products to be portioned through a scanning station and through a portioning station, comprising:
   (a) a first endless belt having an infeed end and an outfeed end;
   (b) a first drive roller in frictional engagement with the first endless belt;
   (c) a drive system for driving the first drive roller;
   (d) a first belt tensioning and dampening system for applying a tension load on the first endless belt of sufficient level to maintain frictional engagement between the first endless belt and a first drive roller, and for simultaneously dampening vibrations that occur in the first endless belt;
   (e) a second endless belt having an infeed end adjacent the outfeed end of the first endless belt to receive work products from the first endless belt;
   (f) a second frictional drive roller about which the second endless belt is trained for driving the second endless belt;
   (g) the drive system also driving the second drive roller; and
   (h) a control system for controlling the speeds of the first and second drive rollers.

43. The conveyor system according to claim 42, wherein the control system synchronizes the speeds of the first and second drive rollers to drive the corresponding first and second endless belts at substantially the same speed.

44. The conveyor system according to claim 42, wherein the first endless belt is composed of fabric material, and the second endless belt is composed of flat wire material formed in a series of pickets that extend transversely across the length of the second endless belt, said pickets restrained relative to each other in the direction lengthwise of the second endless belt.

45. The conveyor system according to claim 42, further comprising a second tensioning and dampening system for the second endless belt, said second belt tensioning and dampening system positioned relative to the second drive roller to apply a tensioning load on the second endless belt to maintain adequate frictional engagement between the second endless belt and the second drive roller, and applying a dampening force on the second endless belt upon vibrations imposed upon the second endless belt.

46. The conveyor system according to claim 45, wherein the second tensioning and dampening system comprises a second pivot frame pivotally mounted relative to the second drive roller, and a second tensioning roller rotatably engaged with the second endless belt and mounted on the second pivot frame at a location space from the pivotal mounting of the second pivot frame relative to the second drive roller.

* * * * *